(12) United States Patent
Uchikawa

(10) Patent No.: US 8,363,256 B2
(45) Date of Patent: *Jan. 29, 2013

(54) IMAGE PROCESSING APPARATUS, IMAGE PROCESSING SYSTEM AND IMAGE PROCESSING METHOD

(75) Inventor: Hiroshi Uchikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 12/698,215

(22) Filed: Feb. 2, 2010

(65) Prior Publication Data

US 2010/0134823 A1 Jun. 3, 2010

Related U.S. Application Data

(63) Continuation of application No. 11/179,599, filed on Jul. 13, 2005, now Pat. No. 7,679,765.

(30) Foreign Application Priority Data

Jul. 16, 2004 (JP) .................................. 2004-210114

(51) Int. Cl.
*G06K 15/02* (2006.01)
(52) U.S. Cl. ...................... 358/1.15; 358/1.13; 358/1.14; 358/1.16; 358/1.17; 358/1.18
(58) Field of Classification Search .................... None
See application file for complete search history.

(56) References Cited

U.S. PATENT DOCUMENTS

| | | | | |
|---|---|---|---|---|
| 6,559,967 | B1 * | 5/2003 | Akiba et al. | 358/1.16 |
| 6,745,334 | B1 * | 6/2004 | Ikegami | 726/19 |
| 6,823,092 | B1 * | 11/2004 | Sato | 382/305 |
| 7,679,765 | B2 | 3/2010 | Uchikawa | |
| 2003/0133152 | A1 * | 7/2003 | Matsueda | 358/1.15 |
| 2003/0179404 | A1 * | 9/2003 | Matsueda | 358/1.15 |
| 2003/0218768 | A1 * | 11/2003 | Sato | 358/1.14 |
| 2004/0012812 | A1 * | 1/2004 | Shimizu | 358/1.15 |

* cited by examiner

*Primary Examiner* — Twyler Haskins
*Assistant Examiner* — Pawandeep Dhingra
(74) *Attorney, Agent, or Firm* — Fitzpatrick, Cella, Harper & Scinto

(57) ABSTRACT

An image processing apparatus includes an input unit inputting image data, a memory having a storage region for storing the image data inputted by the input unit, a printer printing the image data in response to an user's instruction of printing the image data stored in the storage region, a transmitting unit transmitting set information indicating setting of the storage region to an other image processing apparatus, and a control unit controlling the transmitting unit not to transmit the set information to the other image processing apparatus when a pass word for accessing the storage region is included in the set information, and to transmit the set information to the other image processing apparatus when the pass word for accessing the storage region is not included in the set information.

8 Claims, 12 Drawing Sheets

FIG. 12

DISTRIBUTE BOX SET INFORMATION

BOX WITH PASS WORD EXSTS.
MAY SET INFORMATION BE
DISTRIBUTED?

YES   NO

IMAGE PROCESSING APPARATUS, IMAGE PROCESSING SYSTEM AND IMAGE PROCESSING METHOD

This application is a continuation of application Ser. No. 11/179,599 filed Jul. 13, 2005.

BACKGROUND OF THE INVENTION

1. Field of the Invention

The present invention relates to a technique by which an image processing apparatus distributes its own set information to other image processing apparatuses.

2. Description of Related Art

The number of apparatuses having a function referred to as a box using a storage device has been increasing among recent image processing apparatuses. A box function is a function of reusing image data stored in every region produced by dividing a storage device, such as a large capacity hard disk, into a plurality of regions beforehand. For example, by storing the image data read with a scanner or the image data transmitted from a computer in a box, and later by specifying the box storing the image with an operation unit to select a target image data in an image data list in the box, it is possible to print the image data as an image, or to transmit the image data to the outside by means of a facsimile or E-mail.

Some image processing apparatuses equipped with such a box function are configured to be able to set a pass word in each box in order that many and unspecified users cannot access the image data in the box.

On the other hand, there is a request for the reduction of management costs by synchronizing the set information of a plurality of apparatuses in a user environment. Various means for distributing the set information on an image processing apparatus to a plurality of other image processing apparatuses have been provided in response to this request. For example, an image processing apparatus capable of distributing predetermined set information to other apparatuses without installing an administrative server has been considered.

As a use form of the box function capable of setting a pass word as described above, the use form can be roughly divided into two categories. One of them is a form in which a plurality of users commonly uses individual boxes without attaching a pass word to each box, and the other of them is a form in which a pass word is attached to each box and each box is personally used as a box for individual use. In an image processing apparatus having the box function, a user can register the way of using each box whether to use it in common by a plurality of users or whether to use it individually as a box for personal use, as box set information. Then, the box set information can be distributed to other image processing apparatuses.

However, when a box is used as a box for individual use, a familiar image processing apparatus on a dwelling floor in a school or an office is usually selected as the image processing apparatus having the box. On the contrary, it is rare to set a box for individual use to the image processing apparatus located on another floor. Therefore, it is frequently unnecessary to distribute a pass word for a box for individual use to an image processing apparatus located far away.

Moreover, in an image processing apparatus, an upper limit exists on the number of boxes. Moreover, the number of the upper limit is not so large. Therefore, if the boxes to which a pass word is set unnecessarily increase in number although they are not used, the user who can use the boxes is unnecessarily limited, and user-friendliness falls.

SUMMARY OF THE INVENTION

The present invention was made to such a background technique, and provides an image processing apparatus, an image processing system and image processing method, all capable of preventing unnecessary setting of pass word in another image processing apparatus even in case of distributing set information including the pass word to the other image processing apparatus, and all capable of avoiding lowering the user-friendliness.

According to an aspect of the present invention, an image processing apparatus includes an input unit inputting image data, a memory having a storage region for storing the image data inputted by the input unit, a printer printing the image data in response to an user's instruction of printing the image data stored in the storage region, a transmitting unit transmitting set information indicating setting of the storage region to an other image processing apparatus, and a control unit controlling the transmitting unit not to transmit the set information to the other image processing apparatus when a pass word for accessing the storage region is included in the set information, and to transmit the set information to the other image processing apparatus when the pass word for accessing the storage region is not included in the set information.

Moreover, according to another aspect of the present invention, an image processing apparatus includes an input unit inputting image data, a memory having a storage region for storing the image data inputted by the input unit, a printer printing the image data in response to an user's instruction of printing the image data stored in the storage region, a transmitting unit transmitting set information indicating setting of the storage region to an other image processing apparatus, and a control unit controlling the transmitting unit not to transmit a pass word in the set information to the other image processing apparatus when the pass word for accessing the storage region is included in the set information, and to transmit the set information to the other image processing apparatus when the pass word for accessing the storage region is not included in the set information.

Moreover, according to further aspect of the present invention, an image processing apparatus includes an input unit inputting image data, a memory including a storage region for storing the image data inputted by the input unit, a printer printing the image data in response to a user's instruction instructing printing the image data stored in the storage region, a receiving unit receiving set information indicating setting of the storage region from another image processing apparatus, an updating unit updating the setting of the storage region based on the set information received by the receiving unit, and a control unit controlling the updating unit not to perform updating by the updating unit when a pass word for accessing the storage region is set, and to perform the updating by the updating unit when the pass word for accessing the storage region is not set.

Other features, objects and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a display example for notifying a user of a box having a set pass word.

DETAILED DESCRIPTION OF THE PREFERRED EMBODIMENTS

Embodiment 1

In the following, Embodiment 1 is described.

Figure 1:
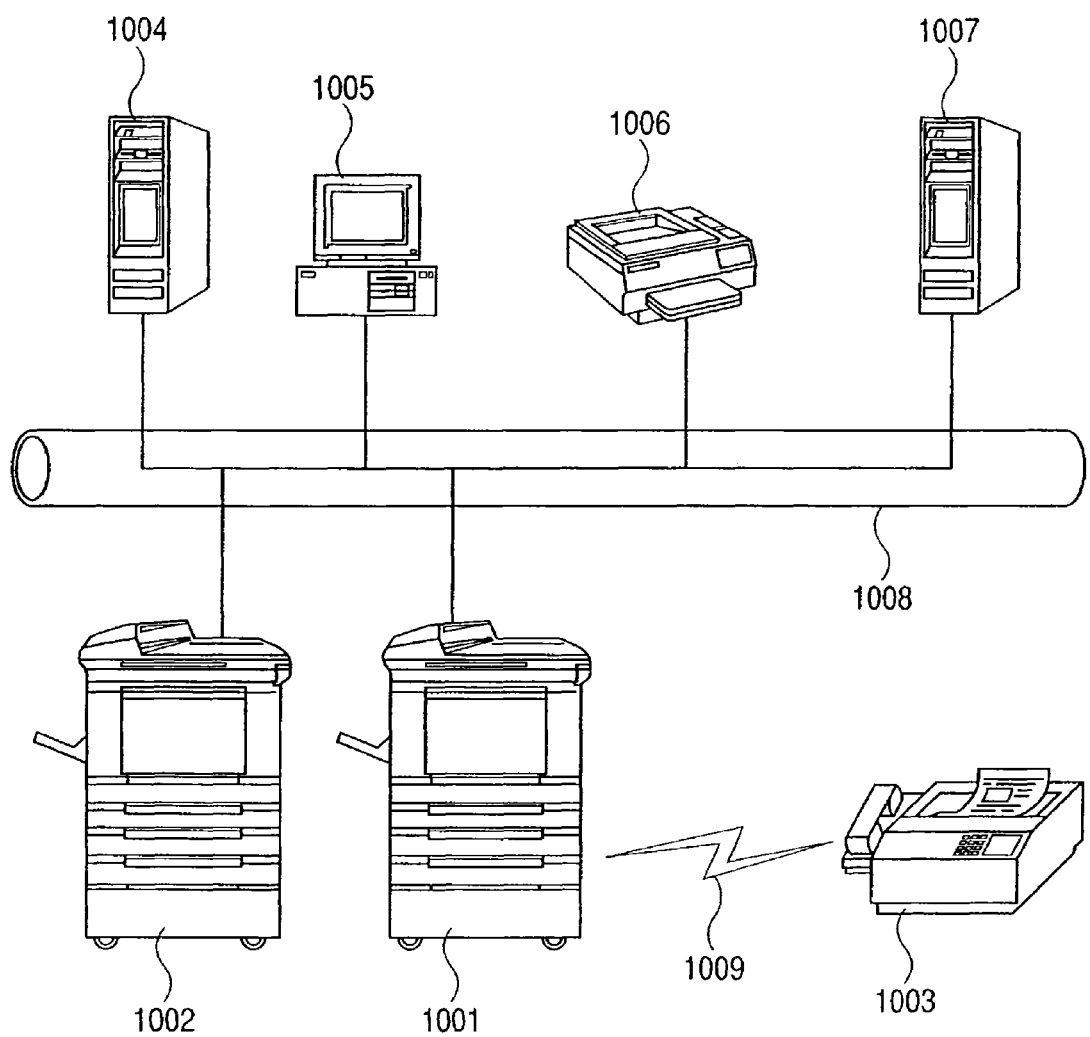
FIG. 1 is a view showing a basic system configuration in Embodiments 1-3.

FIG. 1 is a view of a general system configuration by which an image processing apparatus according to Embodiment 1 is used.

A copier 1001 and a copier 1002 are apparatuses which read a manuscript and transmit the read manuscript to various apparatuses. A facsimile 1003 is a facsimile machine which receives the data read by the copier 1001 through a public line 1009 and prints the received data. A data base/mail server 1004 is a computer in which an application server storing the data read by the copiers 1001 and 1002 is operating. A client server 1005 is a computer which is connected with the data base/mail server 1004 and downloads the stored data to display the data. A printer 1006 is a printing machine which prints the image data read by the copiers 1001 and 1002 and PDL data generated by the client server 1005. A directory server 1007 stores various kinds of directory information such as names, E-mail addresses and fax numbers. The copiers 1001 and 1002 and the client server 1005 can access these pieces of directory information by protocols such as Lightweight Directory Access Protocol (LDAP). An Ethernet 1008 is a network to which the copiers 1001 and 1002, the data base/mail server 1004, the client server 1005, the printer 1006 and the directory server 1007 are connected. Incidentally, the copiers 1001 and 1002 in the present embodiment severally have a box function. The box function is a function of reusing the image data stored in every region produced by dividing a storage device such as a large capacity hard disk into a plurality of regions beforehand. For example, by storing the image data read with a scanner or the image data transmitted from a computer in a box, and later by specifying the box storing the image with an operation unit to select the target image data in an image data list in the box, it is possible to print the image data, or to transmit the image data to the outside by means of a facsimile or E-mail.

In Embodiment 1, although a form (push type) in which set information is distributed from the copier 1001 to the copier 1002 using the Ethernet 1008 without making the client server 1005 intervene between the copiers 1001 and 1002 is described, a form (pull type) in which the copier 1002 acquires set information from the copier 1001 may be adopted. Alternatively, a configuration in which the client server 1005 accesses the copier 1001 to download set information and then the set information is uploaded from the client server 1005 to the copier 1002 may be adopted. The connection medium in this case may be any one which can perform bidirectional communication, and also the protocol used for mutual data transmission and reception among the copiers 1001 and 1002 and the client server 1005 on the connection medium may be any one of the existing protocols such as Hyper Text Transfer Protocol (HTTP), Simple Object Access Protocol (SOAP), and File Transfer Protocol (FTP). The protocol may be a quite original application protocol.

Figure 2:
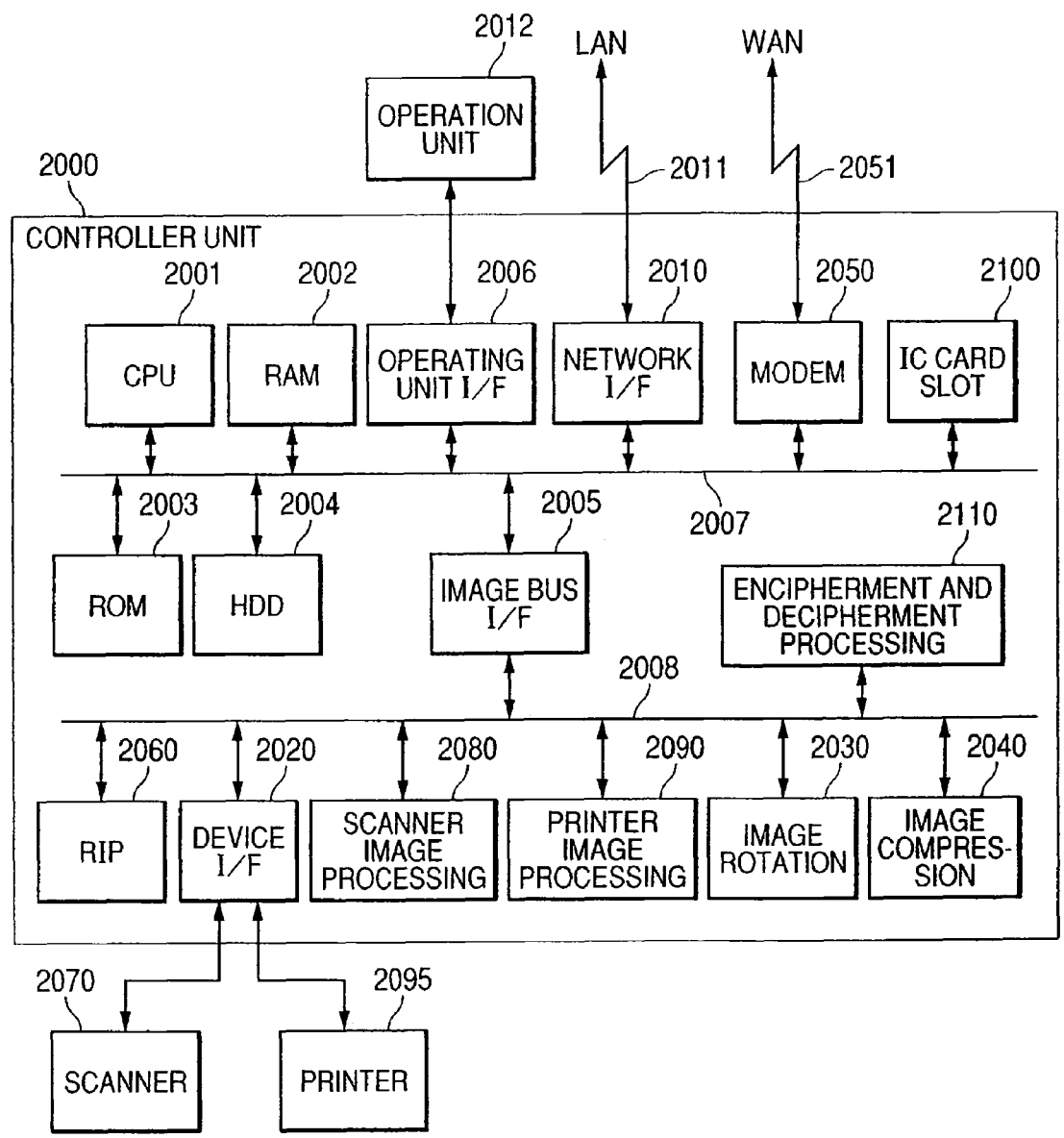
FIG. 2 is the system block diagram of each of a copier 1001 and a copier 1002 in Embodiments 1-3.

FIG. 2 is a system block diagram in Embodiment 1, and the system is mounted in the copiers 1001 and 1002.

A controller unit 2000 is a controller for performing input and output of image information and device information by being connected with a scanner 2070, being an image input device, and a printer 2095, being an image output device, and by being connected with a LAN 2011 and a public line (WAN) 2051 on the other hand. A CPU 2001 is a controller controlling the whole system. A RAM 2002 is a system work memory for the CPU 2001 to operate, and is also an image memory for storing image data temporarily. A ROM 2003 is a boot ROM, and the boot program of a system is stored. A HDD 2004 is a hard disk drive, and stores system software and image data. An operating unit I/F 2006 is an interface unit with an operation unit (UI) 2012 including a touch panel, and outputs the image data which will be displayed on the operation unit 2012 to the operation unit 2012. Moreover, the operating unit I/F 2006 plays a role of transmitting the information inputted by a user of the present system with the operation unit 2012. A network I/F 2010 is connected to the LAN 2011, and the network I/F 2010 outputs and inputs information. A modem 2050 is connected with a public line 2051, and the modem 2050 outputs and inputs information. The above devices are arranged on a system bus 2007. An image bus I/F 2005 is a bus bridge which connects the system bus 2007 with an image bus 2008, through which image data is transferred at a high speed, and which changes a data structure. The image bus 2008 is composed of a PCI bus or IEEE 1394. The following devices are arranged on the image bus 2008. A raster image processor (RIP) 2060 develops the PDL code to a bit map image. A device I/F unit 2020 connects the controller unit 2000 with the scanner 2070 and the printer 2095, which are an image input device and an image output device, respectively, and changes a synchronous system/an asynchronous system of image data. A scanner image processing unit 2080 performs correction, processing and editing to input image data. A printer image processing unit 2090 performs a correction, a resolution conversion and the like of the printer 2095 to printing output image data. An image rotation unit 2030 rotates image data. An image compression unit 2040 performs compression processing and expansion processing by JPEG for multilevel image data, or by JBIG, MMR and MH for binary image data. An IC card slot 2100 enables inputting and outputting a key used for encipherment and decipherment by inputting a suitable personal identifier number (PIN) code after inserting an IC card medium. An encipherment and decipherment processing unit 2110 is a hardware accelerator board for performing encipherment/decipherment processing of data using the key of the IC card slot 2100.

Figure 3:
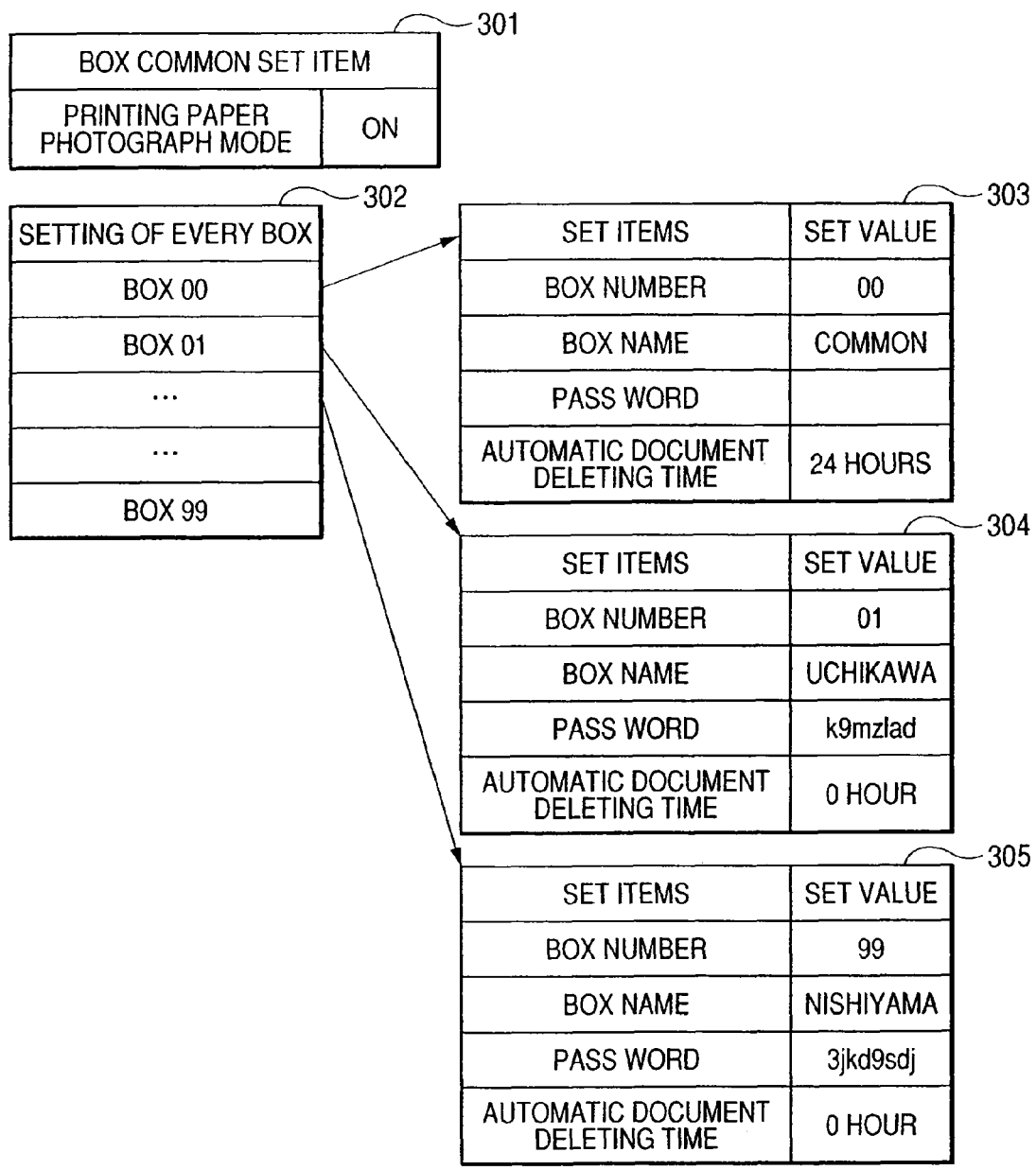
FIG. 3 is an example of box set information on each of the copier 1001 and the copier 1002 in Embodiments 1-3.

FIG. 3 is an example of the box set information on the copiers 1001 and 1002 in Embodiment 1.

The box set information can be roughly divided into two categories. One of them is box common setting 301 pertaining to the setting common to the whole of a plurality of boxes. The other of them is the setting of every box 302 pertaining to the box setting for every box. In the present embodiment, each of the copiers 1001 and 1002 has the total of 100 boxes of the box numbers 00-99. Then, the plurality of boxes can be used, for example, by an individual user or by a group. Here, the box common setting is the setting common to all of the 100 boxes. For example, a "printing paper photograph mode" is an example of the box common set item. When the "printing paper photograph mode" is set to be on, "print photograph" and "printing paper photograph" are made to be possible to be selected. The example of FIG. 3 shows the case where the "printing paper photograph mode" is set to be on.

In the setting of every box 302, the setting of every box of the 100 boxes is shown. Reference numerals 303, 304 and 305 show the examples of the setting of every box with regard to the box numbers of No. 00, No. 01 and No. 99, respectively. There are a "box name", a "pass word" and an "automatic document deleting time" as the set items of the setting of every box. In the "box name", a user can set an arbitrary name for make a box easy to identify. The "pass word" can be set in order to avoid that many and unspecified users access the image data in a box. The "automatic document deleting time" sets a time of deleting the image data stored in the box after the elapse of a predetermined time.

The information of the box common setting and the setting of every box is recorded on the HDD 2004 of each of the copiers 1001 and 1002. The information can be referred to or changed with the operation unit 2012 or a computer connected to the controller unit 2000 with the network I/F 2010. Incidentally, although the number of the boxes is set to be 100 in the present embodiment, the number may be more or less than 100. Moreover, the copiers 1001 and 1002 may be configured to be able to set the set items other than the set items mentioned above.

In the present embodiment, it is possible to distribute the box set information described with reference to FIG. 3 so that the box set information may be synchronized in a plurality of copiers. For example, the box set information of the copier 1001 can be distributed directly to the copier 1002 without making any servers intervene between the copiers 1001 and 1002, and the box set information of the copiers 1001 and 1002 can be unified.

Figure 4:
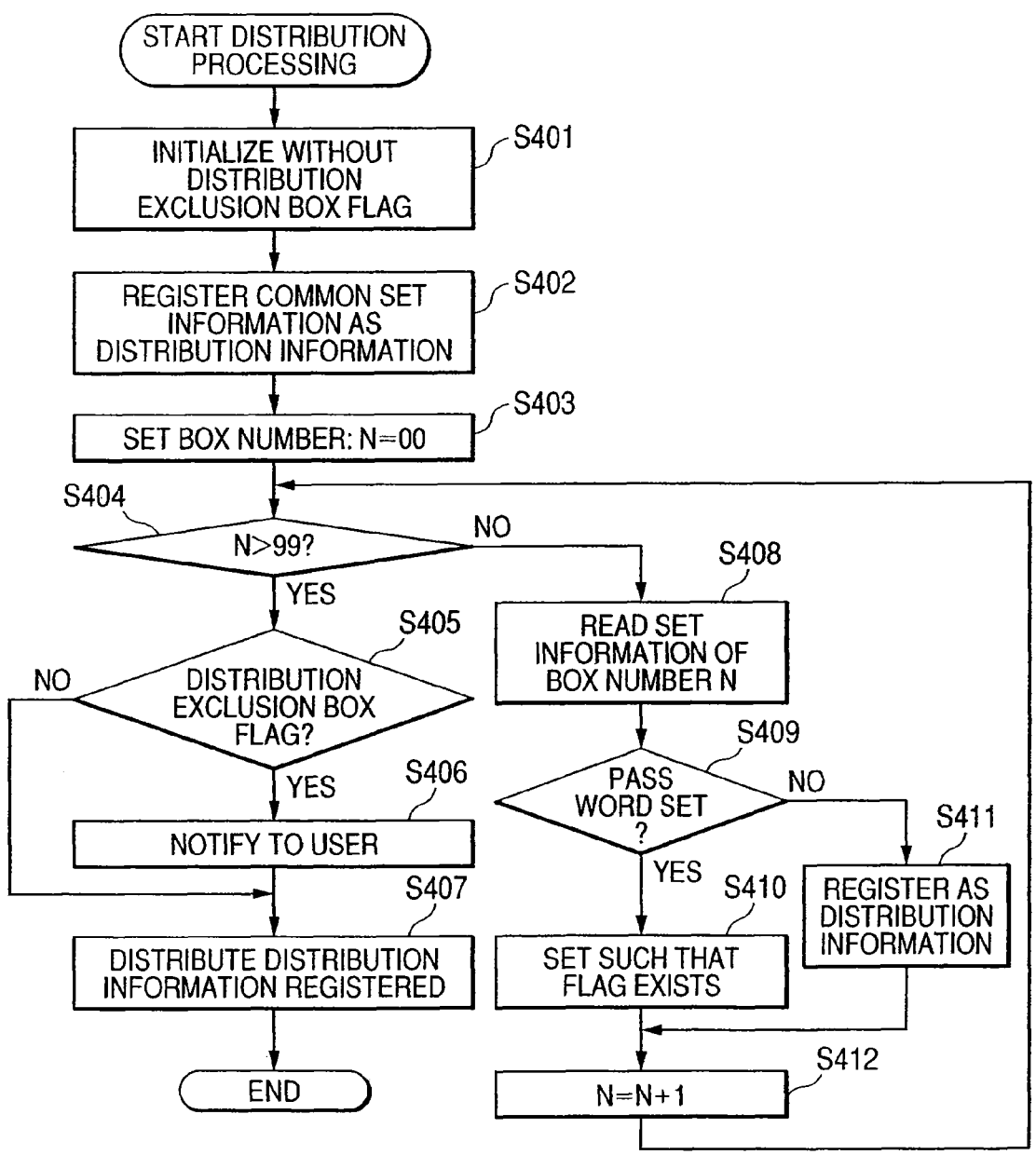
FIG. 4 is a flowchart showing box set information distribution processing in Embodiment 1.

FIG. 4 is a flowchart showing the flow of box set information distribution processing. The processing is executed in response to a predetermined instruction made by a user with the operation unit 2012 of the copier 1001 or 1002, or in response to a predetermined instruction made from a distant place by a user with a computer connected to the control unit 2000 through a network with the network I/F 2010.

First, a distribution exclusion box flag is initialized at Step S401. This operation is one of the initialization processing for the subsequent distribution processing. The processing progresses to Step S402, and the "box common set information" among the pieces of box set information is registered as the distribution information distributed to other copiers. In the example of FIG. 3, the information of "printing paper photograph mode is on" is registered as the distribution information as the box common set information.

Next, the set information for every box is distributed. In order to refer to the set information of every box sequentially in the order from the box number of No. 00 to No. 99, the box number N referred to at Step S403 is set as 00. At Step S404, it is judged whether the box number N is larger than 99 or not. That is, at Step S404, it is judged whether all pieces of box information have been referred to or not. When the number of boxes is 50, it is judged whether the box number is larger than 50 or not here.

When the result of the judgment at Step S404 is no, i.e. when the box number referred to now is 99 or less, the processing progresses to Step S408, and the box set information of the corresponding number is read. For example, in FIG. 3, when the box set information of the box number of No. 00 is read, the pieces of information such as "box number=00", "box name=common", "pass word=none" and "automatic document deleting time=24 hours" are read. Next, the processing progresses to Step S409, and it is judged whether any pass word is set or not by referring to the box set information read at Step S408. When a pass word is set, the processing progresses to Step S410, and the distribution exclusion box flag is set to indicate the existence. Then, the processing progresses to Step S412. When there is no set pass word, the processing progresses to Step S411, and the information read at Step S408 is registered as the distribution information. Then, the processing progresses to Step S412.

At Step S412, a number (N+1) is stored in the box number N, and the processing progresses to Step S404 again. That is, the processing of from Step S408 to Step S412 is repeated until the box number N becomes larger than 99 (or until the answer at Step S404 becomes yes), and set information is referred to about all boxes as a result.

At Step S404, when the number N is judged to be larger than 99, namely it is judged that all the boxes have been referred to, the processing progresses to Step S405. Then, it is judged whether any distribution exclusion box flag exists or not. When it is judged that the distribution exclusion box flag exists, the processing progresses to Step S406, and the existence of the distribution exclusion box flag is notified to the user. That is, it is notified that there is a box (or the box number thereof) to which the set information of every box is not distributed.

When there are no distribution exclusion box flags, or when some distribution exclusion box flags exist, the fact is notified to the user, and the processing progresses to S407. At Step S407, the distribution information registered for distributing to other copiers is distributed to the other copiers. The information transmitted here is specifically the "box common set information" and the "set information of every box" having no set pass word.

Figure 5:
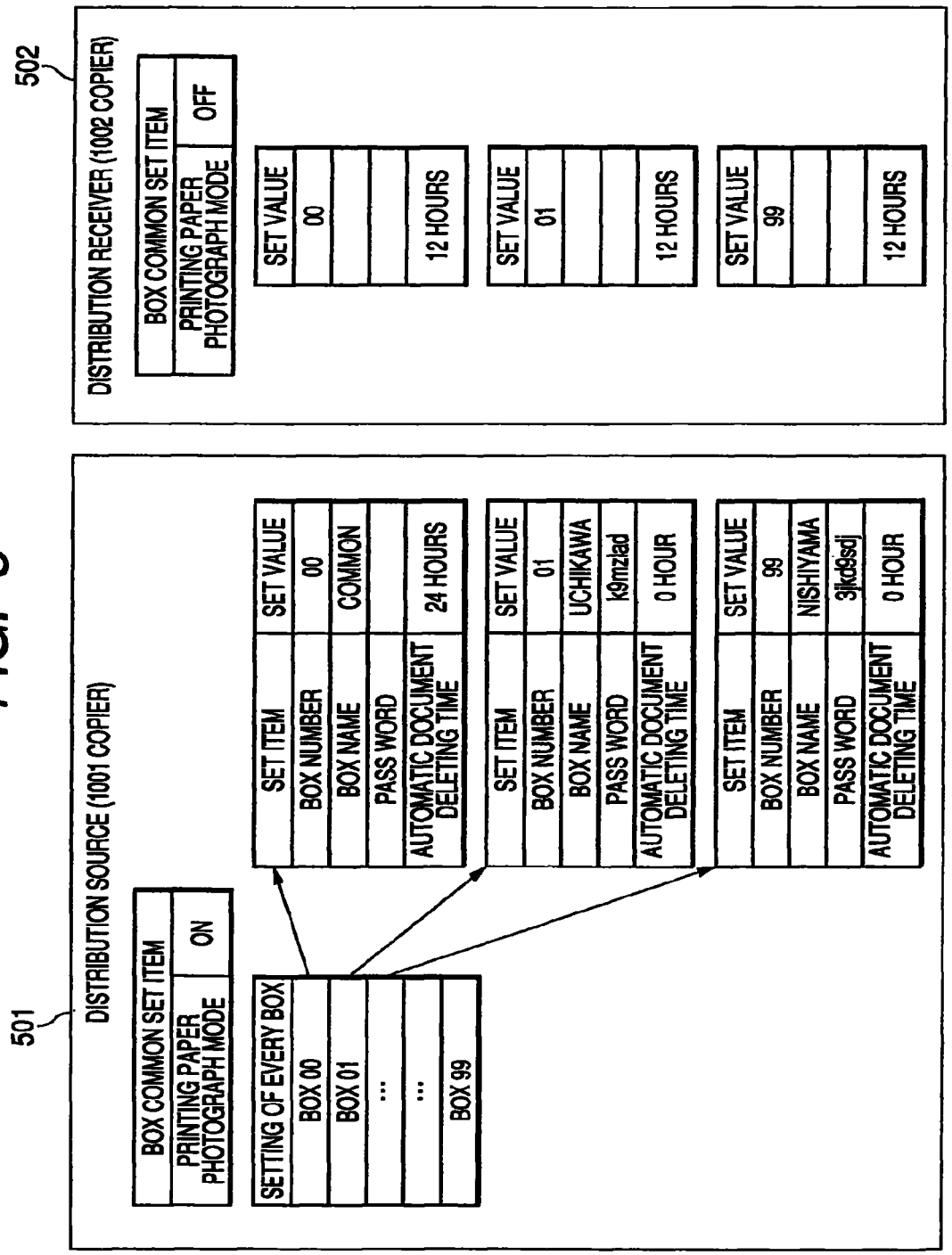
FIG. 5 is an example of the state before the execution of distribution processing of the set information of the copier 1001 used as a distribution source apparatus and the copier 1002 used as a distribution reception apparatus in Embodiment 1.

FIG. 5 shows an example of a state before the execution of the distribution processing of set information of the copier 1001, being the distribution source apparatus, and the copier 1002, being the distribution reception apparatus, in Embodiment 1.

In this state, when a user instructs box set information distribution processing using a computer connected with a network with the operation part 2012 of the copier 1001, which is the distribution source apparatus, or the network I/F 2010 of the copier 1001, the processing shown by the flowchart of FIG. 4 is executed.

Figure 6:
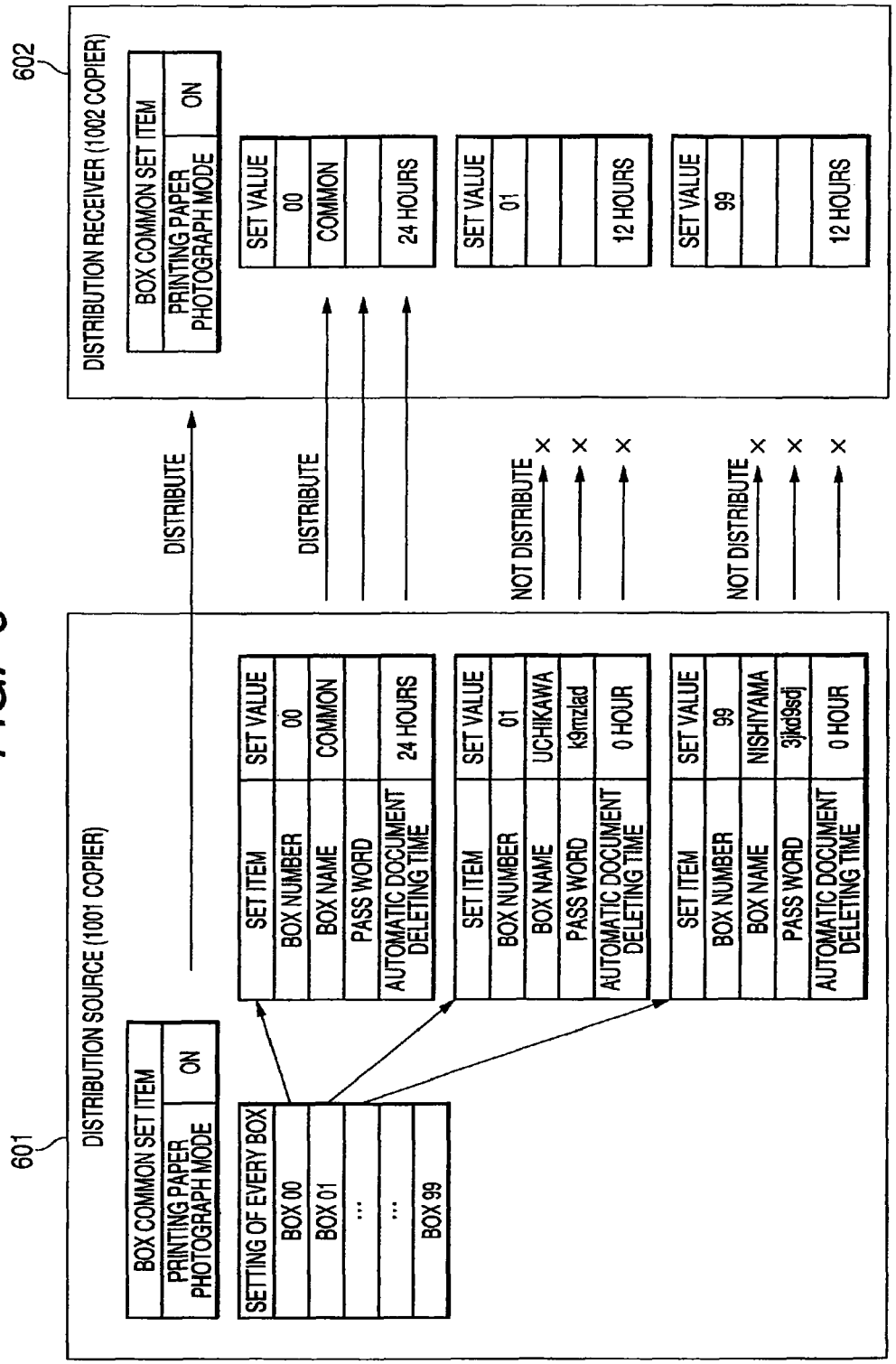
FIG. 6 is an example of the state after the execution of the distribution processing of the set information on the copier 1001 used as the distribution source apparatus and the copier 1002 used as the distribution reception apparatus in Embodiment 1.

FIG. 6 shows an example of the state after the execution of the distribution processing of the set information on the copier 1001 used as the distribution source apparatus and the copier 1002 used as the distribution reception apparatus in Embodiment 1.

As shown in FIG. 5, in the copier 1001, which is the distribution source apparatus, no pass words are set to the box number of No. 00, but, on the other hand, pass words are set to the box numbers of No. 01 and No. 99. Thereby, the box set information of the box number of No. 00 is distributed, and the box set information of the box numbers of No. 01 and No. 99 is not distributed. As the result, the copier 1002, which is the distribution reception apparatus, receives the distribution of the box set information from the copier 1001, and as shown by the reference numeral 602 of FIG. 6, its own box set information is changed. That is, the printing paper photograph mode, which is the "box common set information," is changed into on from off, and the box name, which is the "set information of every box" of the box number of No. 00, is changed into common. Furthermore, the automatic document deleting time is changed into 24 hours.

Although the examples of FIGS. 5 and 6 show the case where a default setting is performed to the box setting of the copier 1002, which is the distribution reception apparatus, it can be also considered in some cases that the boxes of the copier 1002, which is the distribution reception apparatus, are used by any user now. That is, the case where a pass word and the like are set also in the box of the copier 1002, which is the distribution reception apparatus, can be considered.

Figure 7:
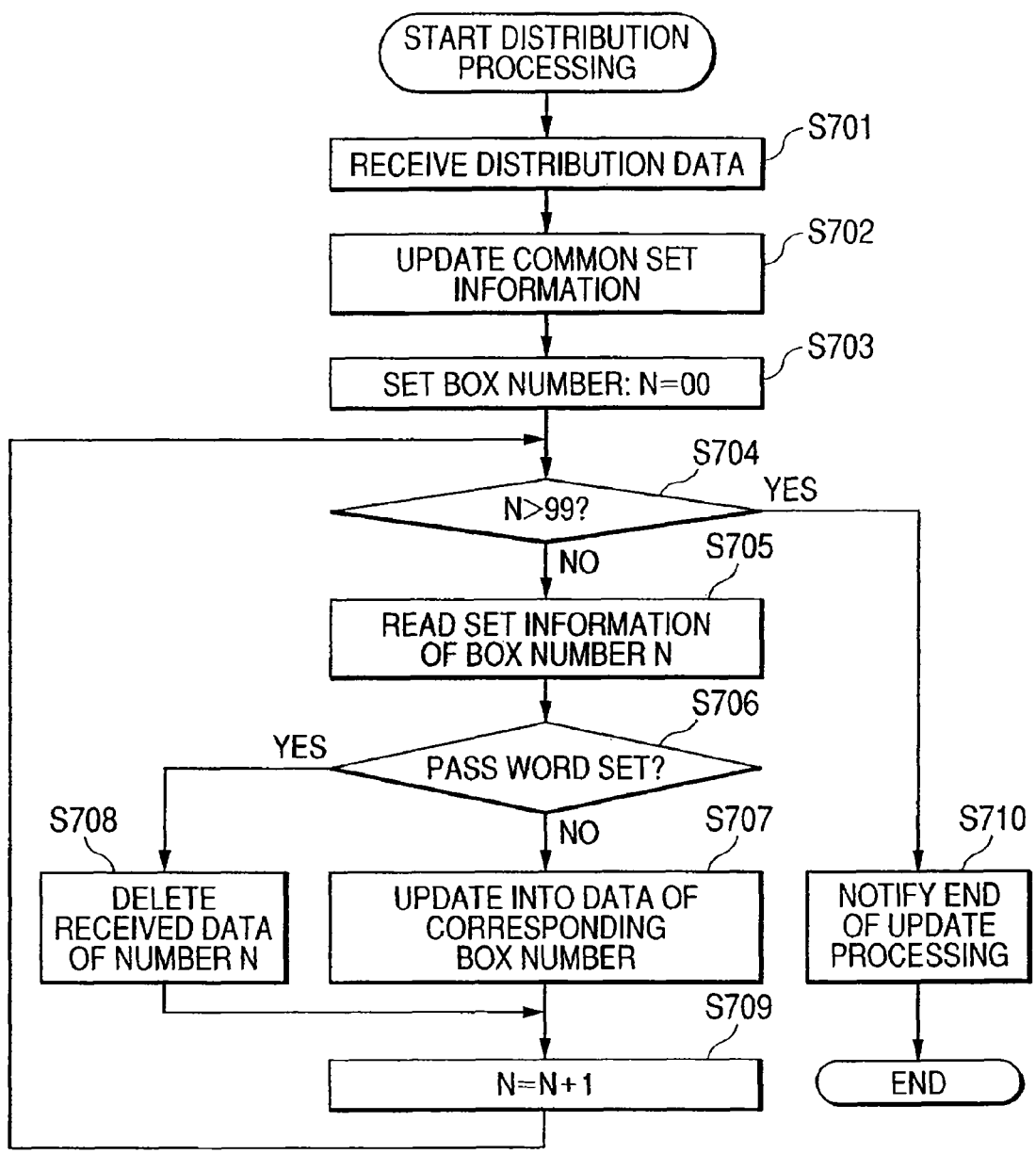
FIG. 7 is a flowchart showing the renewal processing at the time of updating the own box set information of the distribution reception apparatus.

FIG. 7 is a flowchart showing the operation of the renewal processing at the time of receiving the box set information distributed from the copier 1001, and updating the own box set information in the copier 1002, which is the distribution reception apparatus.

The renewal processing of the box set information in the distribution reception apparatus is described using the flowchart of FIG. 7.

First, at Step S701, the copier 1002 receivers the distribution information transmitted from the copier 1001, which is the distribution source apparatus.

The processing of the copier 1002 progresses to Step S702, and the copier 1002 extracts the "box common set information" in the received box set information to renew its own "box common set information".

Then, after Step S703, the copier 1002 performs the renewal processing of the "set information of every box", which is the information other than the "box common set information" in the received box set information. Incidentally, the distributed "set information of every box" is here the set information of every box pertaining to the box having no set pass words in the distribution source apparatus.

First, at Step S703, the copier 1002 sets the box number N to be 00. The processing of the copier 1002 progresses to Step S704, and the copier 1002 judges whether the box number N is larger than 99 or not. That is, the copier 1002 here judges whether the copier 1002 has confirmed its own boxes until the last one (the maximum value of the box number is set to be 99 in the present embodiment) or not.

When the copier 1002 judges to be no at Step S704, the processing thereof progresses to Step S705, and the copier 1002 reads the set information of every box about the box of the box number of No. N among the boxes which the copier 1002 has. The processing of the copier 1002 progresses to Step S706, and the copier 1002 judges whether the read box set information includes any pass word or not. That is, the copier 1002 judges whether the pass word is set to the box of No. N or not. As the result, when the pass word is not set, the processing of the copier 1002 progresses to Step S707. At Step S707, the copier 1002 picks up the "set information of every box" of the number corresponding to the read box number out of the received box set information, and renews its own set information of every box.

When the copier 1002 performs the judgment of yes at Step S706, i.e. when the pass word is set to the box of No. N read at Step S705, the copier 1002 picks up the "set information of every box" of the number corresponding to the number out of the received box set information, and deletes the information. After that, the processing of the copier 1002 progresses to Step S709, and the copier 1002 stores the number (N+1) into the box number N to return to Step S704 again.

Thus, the copier 1002 judges whether any pass words are set to each of its own boxes one by one. When no pass words are set, the copier 1002 renews the box of the number to the received set information of every box. When a pass word is set, the copier 1002 abandons the set information of every box received related to the box of the number.

When the copier 1002 performs the judgment of yes at Step S704, namely when the renewal processing is completed with regard to all boxes, the processing of the copier 1002 progresses to Step S710, and copier notifies the user of the end of the renewal processing by displaying the end of the renewal processing on the operation panel of the operation unit 2012, or by the similar operation.

Figure 8:
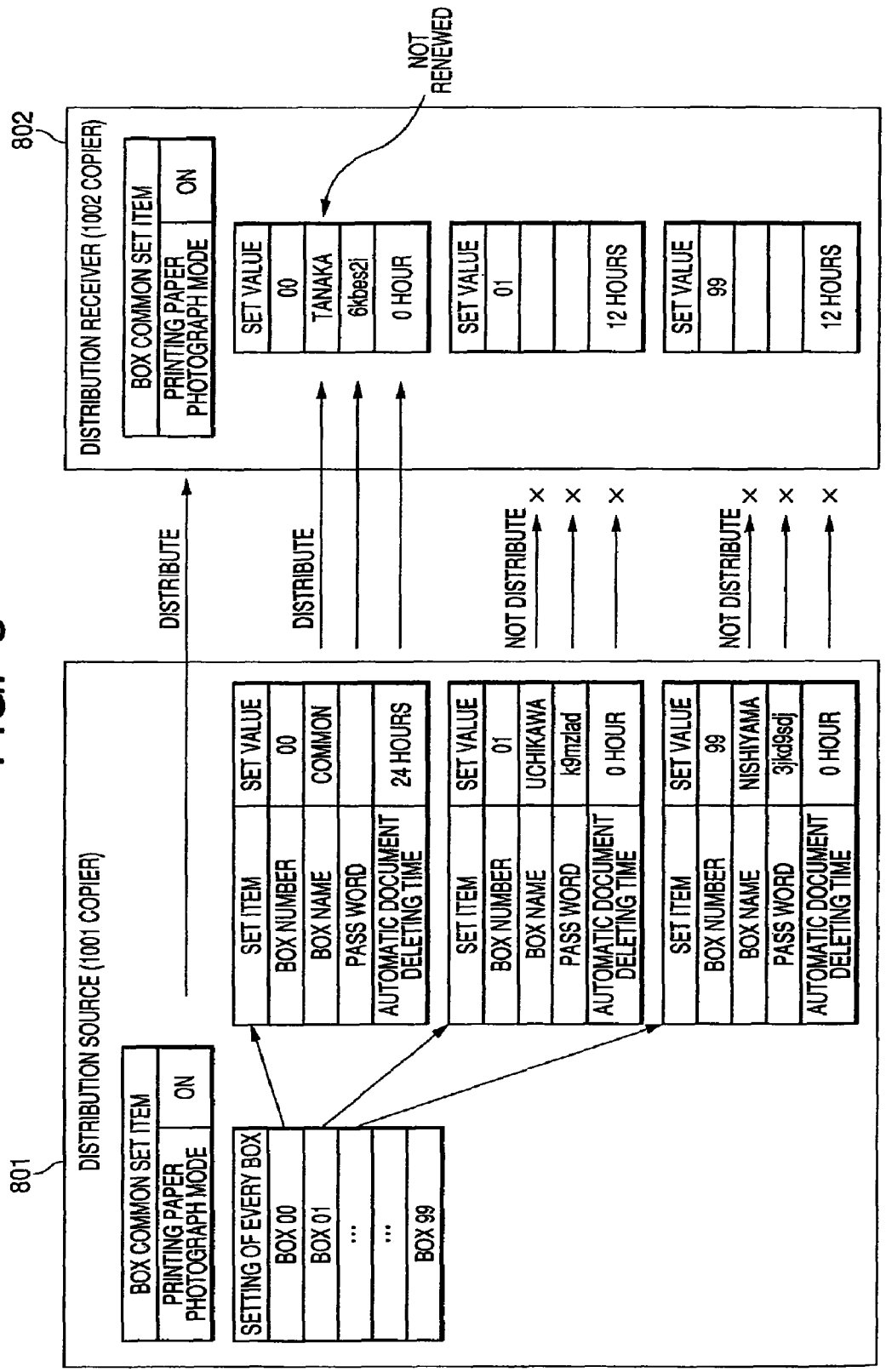
FIG. 8 is an example of the state after the execution of the distribution processing of the set information on the copier 1001 used as the distribution source apparatus and the copier 1002 used as the distribution reception apparatus in Embodiment 1.

FIG. 8 is an example of the state after the execution of the distribution processing of the set information on the copier 1001 used as the distribution source apparatus and the copier 1002 used as distribution reception apparatus in Embodiment 1.

The point different from the example shown in FIG. 6 is that a box having a set pass word exists in the boxes of the copier 1002, which is the distribution reception apparatus. As described above using the flowchart of FIG. 7, no renewal processing is performed to the box having a set pass word even when the box set information is distributed. That is, because the pass word is set to the box of the box number of No. 00 of the copier 1002, the renewal processing has not been performed. As a result, when the box set information is distributed from the copier 1001 to the copier 1002, the box set information of the box numbers to each of which no pass words are set and the box common set information are synchronized with each other between the copiers 1001 and 1002.

As described above, according to Embodiment 1, it is possible to directly distribute own box set information to another copier without making any external apparatuses such as a server intervene in order to synchronize the box set information of a plurality of copiers. Furthermore, because the box set information of a box having a set pass word in the copier used as the distribution source apparatus can be prevented from being distributed needlessly, a more user-friendly box set information distribution system can be provided. On the other hand, also to the box having a set pass word in the copier used as the distribution reception apparatus, the box set information of the box is not renewed arbitrarily, and the user-friendly box set information distribution system can be provided.

Embodiment 2

Embodiment 2 is shown below.

Because the basic system configuration diagram, the basic system block diagram, an example of the box set information, and an example of the state of the execution of the distribution processing of Embodiment 2 are the same as those of FIGS. 1, 2, 3 and 5 of Embodiment 1, respectively, their details are omitted.

The method of Embodiment 1 is one in which, when a pass word is set to the box set information for distribution, the box set information of the box is excluded from the distribution objects. However, it is considerable that in some cases, for example, a box name, an automatic document deleting time and the like, which are the box set information other than the pass word, are desired to be distributed.

Accordingly, in Embodiment 2, when a pass word is set to the box set information to be distributed, the box set information other than the pass word in the box set information are made to be an object to be distributed, and only the pass word information is excluded from the objects to be distributed.

Hereinafter, the box set information distribution processing in Embodiment 2 is described using FIG. 9.

Because the processing from Step S901 to Step S904 is the same as that from Step S401 to Step S404 in the FIG. 4, respectively, the description thereof is omitted.

When the result of the judgment at Step S904 is no, namely when the box number referred to now is 99 or less, the processing progresses to Step S908, and the box set information of the corresponding number is read. Next, the processing progresses to Step S909, and the box set information read at Step S908 is referred to. Then it is judged whether any pass word is set to the referred box set information or not. When a pass word is set, the processing progresses to Step S910, and the set information other than the pass word information among the box set information of the corresponding box number is registered as distribution information. After that, at Step S911, the distribution exclusion box flag is set to indicate the existence, and the processing progresses to Step S913.

When there is no pass word setting as a result of the judgment of Step S909, the processing progresses to Step S912, and the information read at Step S908 is registered as distribution information. Then, the processing progresses to Step S913.

At Step S913, a number (N+1) is stored in the box number N, and the processing again progresses to Step S904. That is, the processing of Steps S908 to S913 is repeated until the box number N becomes larger than 99 (until the judgment result at Step S904 becomes yes), and the set information is referred to about all boxes as a result.

When it is judged that the box number N is larger than 99, namely it is judged that all of the boxes have been referred to, at Step S904, the processing progresses to Step S905, and it is judged whether there are any distribution exclusion box flags or not. When it is judged that there is a distribution exclusion box flag, the processing progresses to Step S906, and the existence of the distribution exclusion box flag is notified to a user. That is, it is notified that there is a box to which any pass words is not distributed, or the box number is notified.

When there are no distribution exclusion box flags, or after the notification of the existence of the distribution exclusion box flags when they exist, the processing progresses to Step S907. At Step S907, the distribution information registered for distributing to other copiers is distributed to the other copiers. The information transmitted here is specifically the "box common set information", the "set information of every box" having not set pass words, and the "set information of every box other than pass word" having a set pass word.

Figure 10:
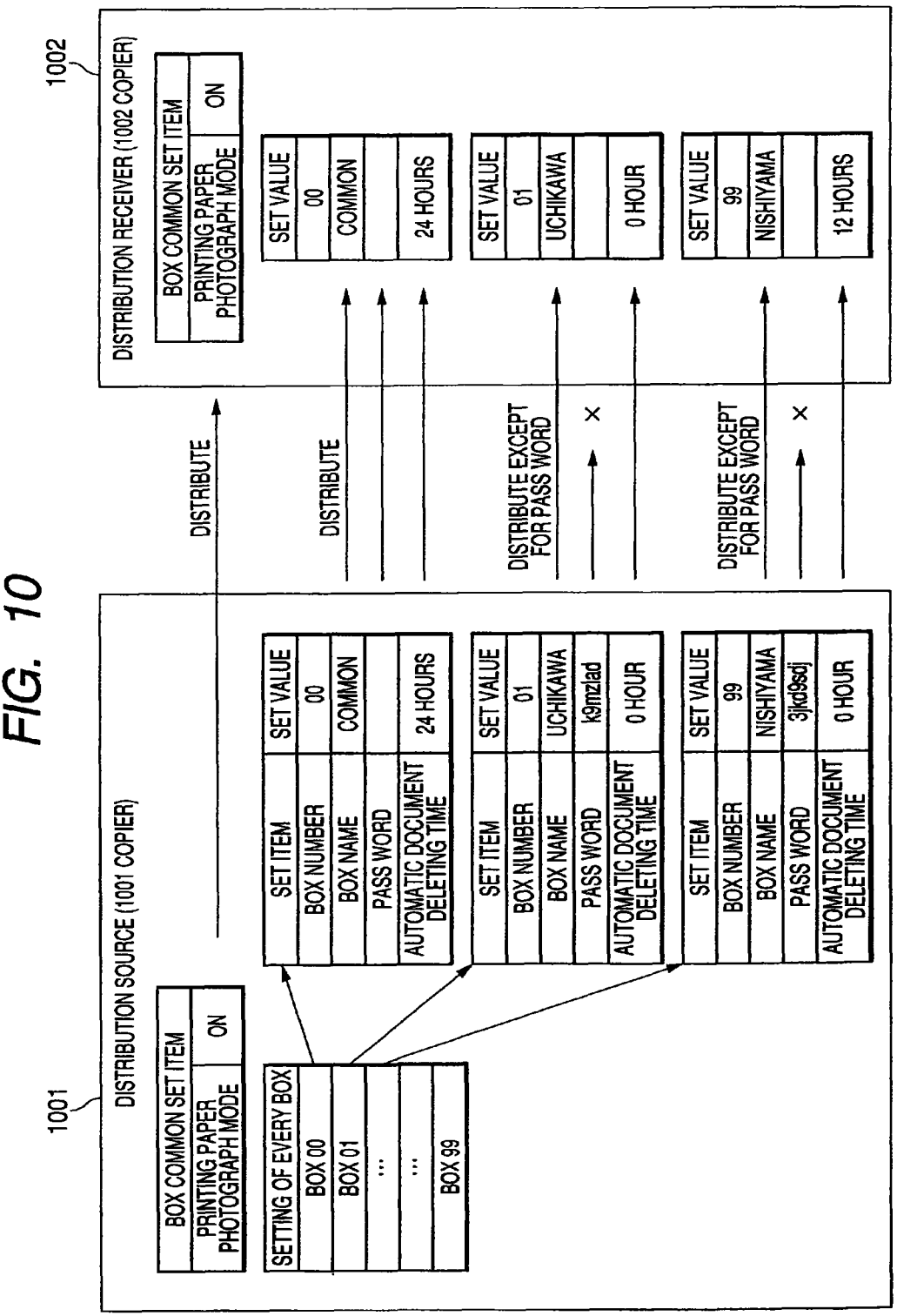
FIG. 10 is an example of the state after the execution of the distribution processing of the set information on the copier 1001 used as the distribution source apparatus and the copier 1002 used as the distribution reception apparatus in Embodiment 2.

FIG. 10 is an example of the state after the execution of the distribution processing of the set information on the copier 1001 used as the distribution source apparatus and the copier 1002 used as the distribution reception apparatus in Embodiment 2.

Figure 9:
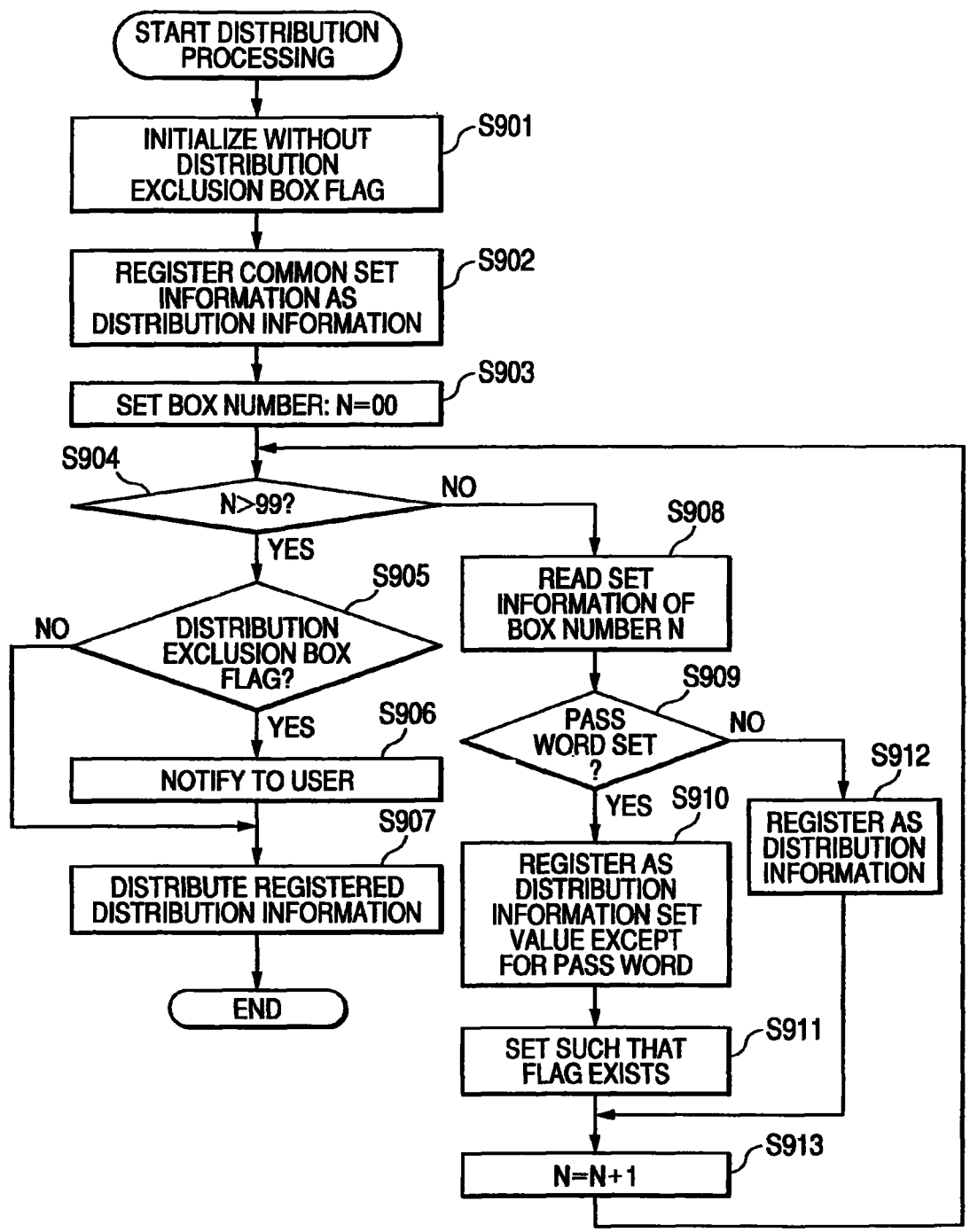
FIG. 9 is a flowchart showing the box set information distribution processing in Embodiment 2.

By executing the flowchart of FIG. 9 from the state of FIG. 5, all of the set information of every pass word of the box 00, to which no pass words are set, is distributed from the copier 1001 used as the distribution source apparatus, and the set information of every box other than the pass word is distributed to the box 01 and the box 99, which have set pass words. In response to the distribution, as for the box set information of the copier 1002 used as the distribution reception apparatus, all the set information of every box is changed as for the box 00, and the set information of every box other than the pass words are changed as for the set information of the boxes 01 and 99.

As described above, according to Embodiment 2, for example, a box name, an automatic document deleting time and the like, which are the box set information other than the pass words, can be transmitted as for the boxes having set pass words.

Embodiment 3

Embodiment 3 is shown below.

Because the basic system configuration diagram, the basic system block diagram, an example of the box set information, and an example of the state of the execution of the distribution processing of Embodiment 3 are the same as those of FIGS. 1, 2, 3 and 5 of Embodiment 1, respectively, their details are omitted.

The methods of Embodiment 1 and Embodiment 2 are one in which, when a pass word is set to the box set information to be distributed, the box set information of the box is excluded from the distribution objects, or one in which only the pass word is excluded from the distribution objects in the same case.

However, it is considerable that in some cases, the box set information of the box having a set pass word is all desired to be transmitted in order to synchronize the box set information between copiers even if the pass word is set to the box set information to be distributed.

Accordingly, in Embodiment 3, when a pass word is set to the box set information to be distributed, it is made to be possible for a user to select whether the box set information pertaining to the box is made to be a distribution object or not.

Hereinafter, the box set information distribution processing in Embodiment 3 is described using FIG. 11.

Figure 11:
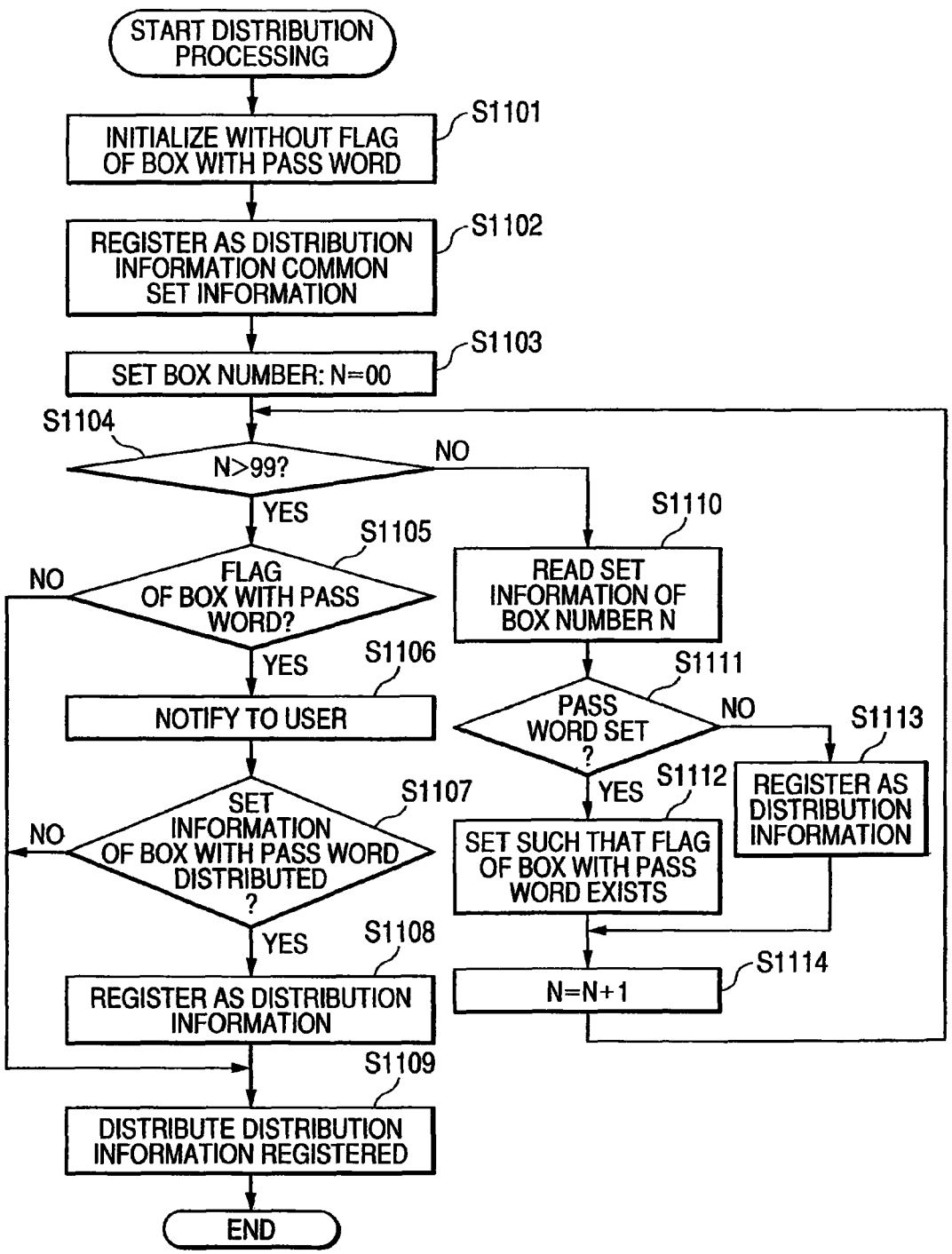
FIG. 11 is a flowchart showing the box set information distribution processing in Embodiment 3.

Because the processing of FIG. 11 is basically the same flow as that of FIG. 4 illustrating the box set information distribution processing in Embodiment 1, the steps performing the same processing as that of FIG. 4 are omitted to be described, and only the steps different from those of Embodiment 1 are described.

First, initialization is performed without the flag of box with pass word. The initialization is almost the same processing as the processing of initialization without the distribution exclusion box flag at Step S401 in FIG. 4. But in the processing of Embodiment 3, because the set information of every box of the box having a set pass word is not automatically excluded from the distribution information, only the point that whether the pass word setting is performed or not is checked to each box is different.

When it is judged that a pass word is set to a box of an object at Step S1111, the flag of box with pass word is set to indicate the existence at Step S1112.

Similarly to the processing of FIG. 4, when the judgment of whether the pass word setting has been performed to all of the own boxes or not has ended (when the judgment at Step S1104 becomes yes), the processing progresses to Step S1105.

At Step S1105, it is judged whether any flag of box with pass word exists or not. When the result of the judgment is no, the processing progresses to Step S1109, and the box set information registered as the distribution information is distributed. That is, in this case, the box common set information and the set information of every box corresponding to all the boxes are distributed.

When the result of the judgment at Step S1105 is yes, namely when there is a box to which a pass word is set, the processing progresses to Step S1106, and the existence of the box is notified to the user. As the method of the notification, a display panel of the operation unit 2012 and a method of displaying the existence of the box on the display of a computer connected to the network through the network I/F 2010. FIG. 12 is a display example at this time. As shown in FIG. 12, the existence of the box is displayed on the display panel of the operation unit 2012 of the copier being operated now, or on the display of the computer connected through the network with the network I/F 2010, and the user is let to select whether the set information of every box pertaining to the box having the set pass word may be set as the distribution information or not. Incidentally, in the display example shown in FIG. 12, the user is let to select whether to distribute the set information of every box or not. But, for example, when there is a plurality of boxes having set pass words, it is possible to adopt a system by which the user can select the execution of the distribution of the set information of every box to every box in a way in which a certain box is made to be distributed and another box is made not to be distributed, or in a similar way. By adopting such a system, the user can perform finer setting with regard to the distribution of the box set information.

At Step S1107, it is judged whether there has been any instruction instructing to set the set information of every box pertaining to the box having the set pass word to the distribution information from the user or not.

When the instruction instructing the distribution has been made, the processing proceeds to Step S1108, and the set information of every box pertaining to the box having the set pass word is registered as the distribution information. When it is possible to set the execution of the distribution to every box, the set information of every box pertaining to the box the distribution of which has been instructed is registered as the distribution information.

When the result of the judgment at Step S1107 is no, namely when it is instructed not to set the set information of every box pertaining to the box having the set pass word as the distribution information, or when the processing at Step S1108 has ended, the processing progresses to Step S1109, and the box set information registered as the distribution information is distributed.

As described above, according to Embodiment 3, when a pass word is set to the box set information to be distributed, it is made to be possible for a user to select whether to set the box set information pertaining to the box as an object to be distributed or not. Consequently, a box set information distribution system more reflecting the requirement of the user can be provided.

Other Embodiments

Although the copier has been exemplified as the image processing apparatus, the present invention is not limited to the copier, and the present invention can be applied to various image processing apparatuses provided with storage means (the so-called box function) composed of a plurality of storage regions.

In the above described embodiment, based on the existence and inexistence of the pass word, it is determined as to whether the distribution exclusion box flag is set to indicate the existence or inexistence. While, in an alternative embodiment, it may be determined based on the other factor. For example, it may be based on a factor as to whether a box name exists or not, or based on a factor as to whether a predetermined check by user exists or not.

Moreover, although the above-mentioned embodiments are ones having box set information as their objects, it is needless to say that the present invention can be applied to the transmission destination information by replacing the box set information with transmission destination information such as an E-mail address, a URL and FAX number.

Incidentally, the present invention may be applied to a system composed of a plurality of pieces of equipment, or may be applied to an apparatus composed of a piece of equipment. It is needless to say that the present invention can be achieved by providing a medium such as a storage medium storing the program codes of the software realizing the functions of the embodiments described above, and by reading the program codes stored in the medium such as the storage medium with a computer (or CPU and MPU) of the system or of the apparatus to execute the read program codes.

In this case, the program codes read from the medium such as the storage medium themselves realize the functions of the embodiments described above, and the medium such as the storage medium storing the program codes constitutes the present invention. As the medium such as the storage medium for supplying the program codes, for example, a floppy (registered trademark) disk, a hard disk, an optical disc, a magneto-optical disc, a CD-ROM, a CD-R, a magnetic tape, a non-volatile memory card, a ROM, download through a network, and the like can be used.

Moreover, not only the functions of the embodiments described above can be realized by executing the program codes read by a computer, but also the case where the functions of the embodiments described above are realized by the actual processing a part or the whole of which is executed by an OS operating on the computer based on the instructions of the program codes is included in the present invention.

Furthermore, it is needless to say that the case where the functions of the embodiments described above are realized by the actual processing a part or the whole of which is executed by a CPU or the like provided in a function expanding board or a function expanding unit based on the instructions of the program codes after the program codes read from the medium such as the storage medium has been read into the function expanding board inserted into a computer or the function expanding unit connected to the computer is included in the present invention.

This application claims priority from Japanese Patent Application No. 2004-210114 filed Jul. 16, 2004, which is hereby incorporated by reference herein.

What is claimed is:

1. An image processing apparatus comprising:
a storing unit adapted to store setting information set by the image processing apparatus;
a processing unit adapted to process image data by using the setting information stored by the storing unit;
a transmitting unit adapted to transmit the setting information stored by the storing unit to another image processing apparatus;

a judging unit adapted to judge whether or not a password is included in the setting information to be transmitted by the transmitting unit; and a controlling unit adapted to control the transmitting unit not to transmit the setting information in a case where it is judged by the judging unit that the password is included in the setting information, and to control the transmitting unit to transmit the setting information in a case where it is judged by the judging unit that the password is not included in the setting information.

2. An image processing apparatus comprising:

a storing unit adapted to store setting information set by the image processing apparatus;

a processing unit adapted to process image data by using the setting information stored by the storing unit;

a receiving unit adapted to receive setting information set by another image processing apparatus, from the another image processing apparatus;

an updating unit adapted to update the setting information stored by the storing unit, by the setting information received by the receiving unit;

a judging unit adapted to judge whether or not a password is included in the setting information stored by the storing unit; and a controlling unit adapted to control the updating unit not to perform the updating in a case where it is judged by the judging unit that the password is included in the setting information, and to control the updating unit to perform the updating in a case where it is judged by the judging unit that the password is not included in the setting information.

3. An image processing apparatus according to claim 1, further comprising a scanner adapted to read image data, wherein the setting information stored by the storing unit is transmission destination information indicating a data transmission destination.

4. An image processing apparatus according to claim 3, wherein the transmission destination information is any one of an E-mail address, a URL, and a FAX number.

5. An image processing system which includes plural image processing apparatuses, the system comprising:

a processing unit adapted to process image data by using first setting information;

a transmitting unit adapted to transmit the first setting information indicating a setting concerning a first image processing apparatus to a second image processing apparatus;

an updating unit adapted to update second setting information indicating setting concerning the second image processing apparatus, by the first setting information transmitted by the transmitting unit; and a judging unit adapted to judge whether or not a password is included in the first setting information to be transmitted by the transmitting unit, wherein the updating unit does not update the second setting information by the first setting information, in a case where it is judged by the judging unit that the password is included in the first setting information.

6. An image processing system which includes plural image processing apparatuses, the system comprising:

a processing unit adapted to process image data by using first setting information;

a transmitting unit adapted to transmit the first setting information indicating a setting concerning a first image processing apparatus to a second image processing apparatus;

an updating unit adapted to update second setting information indicating setting concerning the second image processing apparatus, by the first setting information transmitted by the transmitting unit; and a judging unit adapted to judge whether or not a password is included in the second setting information, wherein the updating unit does not update the second setting information by the first setting information, in a case where it is judged by the judging unit that the password is included in the second setting information.

7. A control method of an image processing apparatus, the method comprising:

a storing step of storing setting information set by the image processing apparatus;

a processing step of processing image data by using the setting information stored in the storing step;

a transmitting step of transmitting the setting information stored in the storing step to another image processing apparatus;

a judging step of judging whether or not a password is included in the setting information to be transmitted in the transmitting step; and a controlling step of controlling not to transmit the setting information in a case where it is judged in the judging step that the password is included in the setting information, and of controlling to transmit the setting information in a case where it is judged in the judging step that the password is not included in the setting information.

8. A control method of an image processing apparatus, the method comprising:

a storing step of storing setting information set by the image processing apparatus;

a processing step of processing image data by using the setting information stored in the storing step;

a receiving step of receiving setting information set by another image processing apparatus, from the another image processing apparatus;

an updating step of updating the setting information stored in the storing step, by the setting information received in the receiving step;

a judging step of judging whether or not a password is included in the setting information stored in the storing step; and a controlling step of controlling not to perform the updating in a case where it is judged in the judging step that the password is included in the setting information, and of controlling to perform the updating in a case where it is judged in the judging step that the password is not included in the setting information.

* * * * *